United States Patent

Matsui et al.

[15] 3,689,105
[45] Sept. 5, 1972

[54] INFLATABLE VEHICULAR SAFETY DEVICE

[72] Inventors: Shunji Matsui, 3065-12, Tameoka-cho, Kanazawa-ku, Yokohama; Yosikazu Hayakawa, 68-1,3-chome, Oppama-higaski-cho, Yokosuka; Kenzo Hirashima, 714, Nishiteras, Kanagawa-ku, Yokohama, all of Japan

[22] Filed: June 24, 1971

[21] Appl. No.: 156,356

[30] Foreign Application Priority Data

July 7, 1970 Japan .......................45/67807
March 1, 1971 Japan .......................46/12266

[52] U.S. Cl................................280/150 AB, 222/3
[51] Int. Cl..............................................B60r 21/06
[58] Field of Search..........280/150 AB; 9/316; 222/3

[56] References Cited

UNITED STATES PATENTS 3,450,414  6/1969  Kobori................280/150 AB
3,618,974  11/1971  Chute..................280/150 AB

*Primary Examiner*—Kenneth H. Betts
*Attorney*—Robert E. Burns et al.

[57] ABSTRACT

A vehicular safety device for protecting a vehicle occupant from injury during a collision of the vehicle with an obstruction, including a normally contracted, expandible confinement and a container storing a liquefied gas to be converted into pressurized gas by the firing of an igniting means as soon as the collision is encountered by the vehicle, the storing device being normally isolated from the confinement by a sealing plate which is detachable attached to the container by a holder. The holder is broken into two halves by the firing of a burstable means which is actuated simultaneously as the igniting means is fired, whereby the pressurized gas in the container is passed into the confinement for expansion at a moment when the liquified gas is expanded.

4 Claims, 5 Drawing Figures

PATENTED SEP 5 1972

3,689,105

INFLATABLE VEHICULAR SAFETY DEVICE

This invention relates to a vehicular safety device and, more particularly, to a safety device adapted to protect a vehicle occupant from forcefully striking against structural parts of the vehicle such as the steering wheel, instrument panel and windshield.

The safety device to which this invention is directed generally includes an inflatable confinement which is usually in a contracted or folded condition and a container of a fluid under pressure or a liquefied gas for expanding the confinement to its protective condition during a collision of the motor vehicle. The operating condition of the vehicle as encountered at an initial stage of the collision is detected by suitable sensing means and the fluid under pressure is admitted into the contracted confinement upon firing of suitable explosive means. The confinement is consequently expanded and projected between the occupant and the structural parts of the vehicle, whereby the occupant is protected from injury.

An object of this invention is to provide a vehicular safety device of the above outlined character, in which a fluid under pressure is admitted into the inflatable confinement immediately when or even simultaneously as a collision is encountered by the motor vehicle.

In the drawing: embodiment

Figure 1:
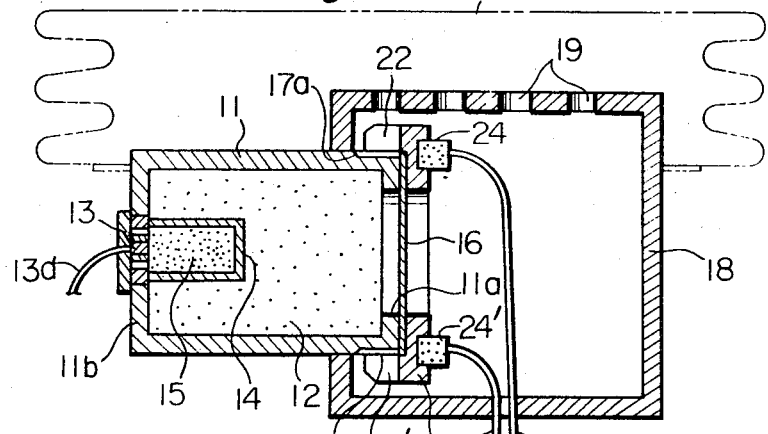
FIG. 1 is a sectional view showing a preferred embodiment of the device according to this invention.

Reference is first made to FIG. 1 wherein the device according to this invention is shown to have an inflatable confinement 10, which is normally held in a contracted condition as shown by a phantom line. The device includes a container 11 of a suitable liquid gas 12. This container 11 is open at one end to form an outlet opening 11a for discharging a pressurized fluid and closed at the other end by an end wall 11b which is integral with the body of the container 11. To the end wall 11b is attached an igniting means 13 which is connected through an electric line 13a to suitable sensing means (not shown) sensing an impact applied to the vehicle and which slightly protrudes into the interior of the container 11. A cartridge 14 which is loaded with an explosive 15 is mounted on the end wall 11b of the container 11 and the igniting means 13 has its leading end slightly embedded in the explosive 15 as illustrated. A sealing plate 16 is detachably attached to the open end of the container 11, hermetically sealing the opening 11a thereof. The sealing plate 16 is secured to the container 11 by means of an apertured holder 17 which is internally threaded as at 17a. A housing 18 is mounted on the container 11, enclosing the holder 17. The housing 18 has formed in its wall a plurality of aperture 19, providing communication between the housing 18 and the confinement 10.

Figure 2:
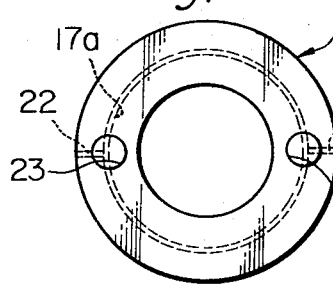
FIG. 2 is a plan view of a sealing plate holder forming part of the device shown in FIG. 1.
Figure 3:
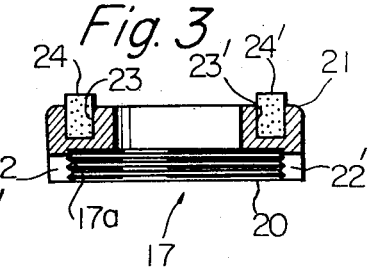
FIG. 3 is a section on line III—III of FIG. 2.

As seen in FIGS. 2 and 3, the apertured holder 17 is made up of an internally threaded flange 20 and an annular abutment 21. The holder 17 is securely fitted to the container 11 through the flange 20 with the abutment 21 in abutting engagement with the outer peripheral portion of the sealing plate 16. The abutment 21 is shown as having an inside diameter substantially equal to the diameter of the opening 11a of the container 11. It should be understood in this instance that, although the holder 17 is herein shown as being in an annular form with the container 11 assumed to have a circular cross section, the holder 17 may be shaped in any desired manner insofar as it is properly aligned with the container 11.

The holder 17 has formed in its flange 20 two slots 22 and 22' which are located in line with each other. Bottomed holes 23 and 23' are formed in the abutment 21. These holes 23 and 23' are located to be respectively aligned with the slots 22 and 22', as seen in FIG. 2. These holes 23 and 23' receive therein a pair of burstable means 24 and 24', respectively, which are connected through lines 25 and 25' to a suitable sensing means (not shown) sensing an impact between the vehicle and an obstruction. This sensing means may be the one connected to the igniting means 13 previously discussed. The burstable means 24 and 24' are caused to fire substantially simultaneously when the igniting means 13 is fired.

When, in operation, a collision is encountered by the motor vehicle, then the igniting means immediately receives immediately receives an electric signal from the not shown sensing means and ignites the explosive 15 contained in the cartridge 14, whereby the liquefied gas 12 in the container 11 is instantaneously and explosively gasified and expanded. Such signal is also applied to the burstable means 24 and 24', which are consequently fired to cause the holder 17 to be broken into two halves along the slots 22 and 22' and the holes 23 and 23'. The holder 17, which has been secured to the container 11 through its threaded flange 20, is now released from the container 11 so that the sealing plate 16 is removed from the container 11 accordingly, permitting the container 11 to communicate with the housing 18 through the opening 11a in the container. The pressurized fluid resulting from the gasification and expansion of the liquefied gas 12 in the container 11 is now allowed into the confinement 10 through the aperture 19, so that the confinement 10 is expanded all of a sudden.

It is to be noted that, since the explosive 15 in the cartridge 14 is fired through transfer of heat from the igniting means 13, the explosive is fired slightly after the firing of the igniting means 13. The burstable means 24 and 24' are fired substantially simultaneously as the igniting means 13 is fired and, as a result, the sealing plate 16 is removed from the container 11 substantially simultaneously as the igniting means 13 is fired. This means that the explosive 15 in the cartridge 14 is ignited and the liquefied gas 12 in the container 11 expanded a moment after the sealing plate 16 has been removed from the container 11. The pressurized fluid resulting from such expansion of the liquefied gas 12 is in this manner rushed into the contracted confinement 10 through the housing 18 substantially simultaneously as the liquefied gas is expanded, without loss in time a kinetic energy for inflating the confinement 10. Since, moreover, the sealing plate 16 is removed through breakaway of the holder 17, not by the pressurized fluid in the container 11 as in the prior art practice, the detonating sound concomitant with the sudden increase of the fluid pressure in the container 11 can be alleviated significantly.

Figure 4:
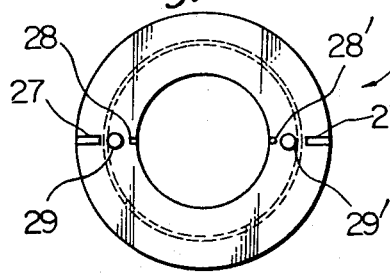
FIGS. 4 and 5 are similar to FIGS. 2 and 3 but show another form of the holder.
Figure 5:
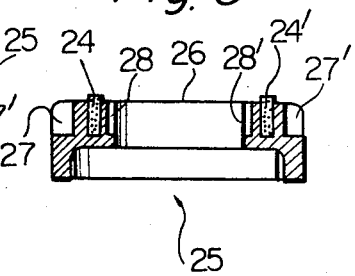

FIGS. 4 and 5 illustrate another form of the apertured holder forming essential part of the safety device according to this invention. Different from the holder 17 previously described, this holder, now designated by 25, has formed in its abutment 26 a first pair of outer slots 27 and 27' and a second pair of inner slots 28 and 28', which are all in line with each other. Holes 29 and 29' are formed between the slots 27 and 28 and between the slots 27' and 28', receiving therein the burstable means 24 and 24' respectively. The operation of the holder 25 thus formed is self-explanatory from the discussion given with respect to the holder 17 of FIGS. 2 and 3 and, therefore, repeated discussion thereof is not herein incorporated.

WHAT IS CLAIMED IS:

1. A vehicular safety device for protecting a vehicle occupant during a collision comprising an inflatable confinement which is normally in a contracted condition, sensing means for sensing an impact between the vehicle and an obstruction, and a device including a container of a liquefied gas and having formed therein an opening, igniting means mounted on said container and connected to said sensing means for being fired when said impact is sensed thereby, an explosive stored in said container, said igniting means having its leading end slightly embedded in said explosive, a sealing plate detachably attached to said container to seal said opening, an apertured holder secured to said container for holding said sealing plate fast on said container, said holder being provided with at least two slots which are substantially in line with each other and with a pair of holes formed adjacent said indents a pair of burstable means received respectively in said holes and connected to said sensing means for being fired when said impact is sensed thereby, and a housing mounted enclosing said holder and communicating with said confinement, said explosive being fired by the firing of said igniting means for converting said liquefied gas into pressurized fluid and said holder being broken into halves along said indents and holes for releasing said sealing plate from said container whereby said pressurized fluid is caused to rush into said confinement through said housing for actuating the confinement to its expanded condition.

2. A device according to claim 1, wherein said holder includes a flange through which the holder is secured to said container and an abutment which is in abutting engagement with said sealing plate.

3. A device according to claim 2, wherein said slots are formed in said flange, and said holes are formed in said abutment.

4. A device according to claim 2, wherein said slots and holes are formed in said abutment.

* * * * *

UNITED STATES PATENT OFFICE
CERTIFICATE OF CORRECTION

Patent No. 3,689,105      Dated September 5, 1972

Inventor(s) SHUNJI MATSUI, YOSIKAZU HAYAKAWA & KENZO HIRASHIMA

It is certified that error appears in the above-identified patent and that said Letters Patent are hereby corrected as shown below:

In the heading of the patent following item 72 Inventors insert

-- 73 Assignee: Nissan Motor Company, Limited, Yokohama City, Japan, a corporation of Japan--.

Signed and sealed this 17th day of April 1973.

(SEAL)
Attest:

EDWARD M. FLETCHER, JR.
Attesting Officer

ROBERT GOTTSCHALK
Commissioner of Patents